May 27, 1924.

J. R. GAMMETER

HAND TRUCK

Filed Nov. 21, 1921

1,495,477

Inventor
John R. Gammeter.
By Robert M. Pierson
Atty.

Patented May 27, 1924.

1,495,477

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

HAND TRUCK.

Application filed November 21, 1921. Serial No. 516,664.

*To all whom it may concern:*

Be it known that I, JOHN R. GAMMETER, a citizen of the United States, residing at Akron, in the county of Summit and State of Ohio, have invented a certain new and useful Hand Truck, of which the following is a specification.

This invention relates to hand trucks, and especially two-wheeled trucks for transporting loaded cans or similar receptacles, and it has for its object to provide improved means for facilitating the dumping of the contents without removing the receptacle from the truck.

Of the accompanying drawings, Fig. 1 is a side elevation, partly broken away, showing a hand truck provided with my improved dumping means, together with a pan for receiving the contents.

Figure 1:
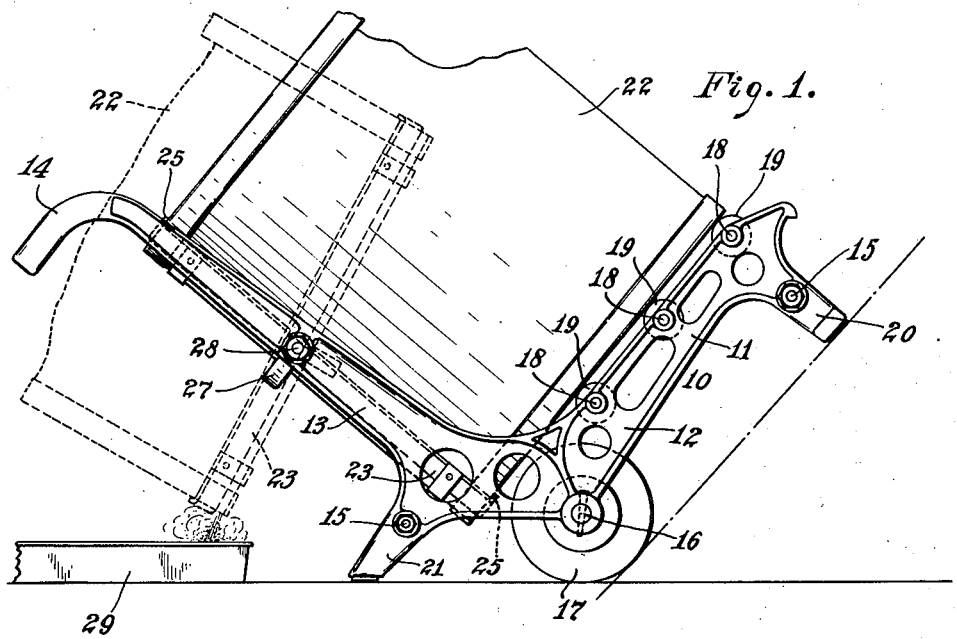
Figure 2:
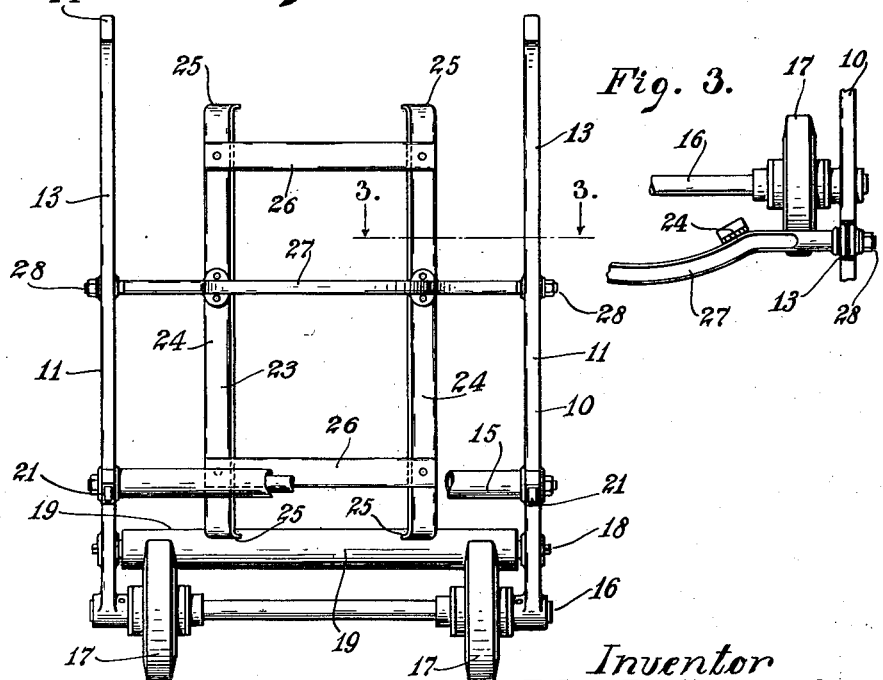
Fig. 2 is a rear elevation of the truck, partly broken away.
Figure 3:
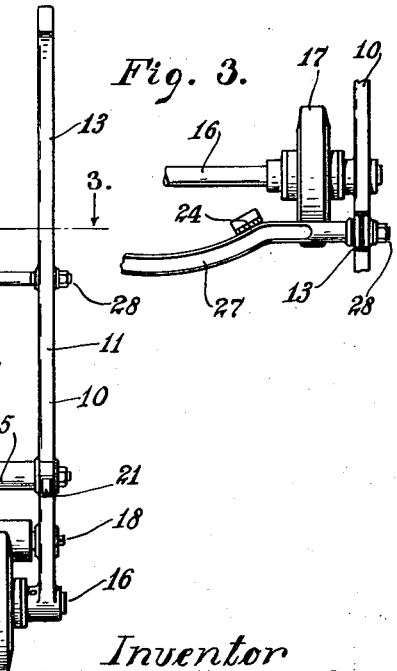
Fig. 3 is a horizontal section on the line 3—3 of Fig. 2.

In the drawings, 10 is the truck frame, composed of a pair of L-shaped side members 11, 11 having base portions 12 and rear uprights 13, formed with handles 14 at their upper ends, together with a pair of main cross-bars 15, an axle 16 at the angle of the frame for the wheels 17, and axle-rods 18 for a series of rollers 19 supported between the base members. Legs 20 are provided at the forward ends of the base members for supporting the truck in its upright position, and legs 21 at the rear end for supporting it in its backwardly-tilted position.

22 is a can or receptacle and 23 is a cradle composed of side bars 24 having forwardly-bent hooks or projections 25 at their upper and lower ends, cross bars 26, and a cross rocker-bar 27 pivoted at 28 on the rear uprights of the main frame. The projections 25 are adapted to take over the upper and lower edges of the receptacle 22 and the lower pair in the normal position of the cradle is located just below the level of the upper sides of the rollers 19.

In the operation of this truck, the workman lifts a loaded can 22 to the level of the rollers 19 when the truck is in its upright position, with the legs 20 resting on the floor, and rolls it on a slight incline over said rollers until its rear side rests against the cradle 23. The truck, with the can thereon is then wheeled to the unloading position in front of a receptacle such as a pan 29 for receiving the contents of the can 22, and the latter, together with the cradle is then tilted to the inverted position represented in broken lines in Fig. 1, so as to dump the contents into the pan. The cradle and empty can are then tilted back to normal position and the truck is ready to be wheeled away for another load.

It will be evident that the use of my improvement enables loaded cans of material to be transported and dumped with much less effort on the part of the workman than is required with an ordinary hand-truck.

I claim:

1. A hand truck comprising a load-supporting base portion and an upright handle portion rising from one end thereof, a pair of wheels journaled on said base portion adjacent its junction with said handle portion, leg members adapted to contact the ground to hold said truck in respective over-center positions with relation to said wheels, a container, and means on said upright portion adapted to receive said container when the latter, resting on said base portion, is tilted toward said upright portion and pivotally to support said container as the latter is further tilted.

2. A two-wheeled hand-truck having a frame provided with a can-supporting base portion, a rear upright portion having handles, and a tilting cradle pivoted on said rear portion and provided with projections for taking over the top and bottom edges of a can.

3. A two-wheeled hand-truck comprising a frame formed with L-shaped side members having base portions and rear uprights, the latter provided with handles at their upper ends, cam-supporting rollers mounted between said base portions, an axle provided with a pair of wheels at the angle of the frame, legs in front and rear of said axle for supporting the truck in its upright and rearwardly-titled positions, respectively, and a tilting cradle pivoted between said rear uprights and having projections adapted to take over the upper and lower edges of a can, the lower projections, when the cradle is in its normal position, being located slightly below the level of the upper sides of said rollers.

In witness whereof I have hereunto set my hand this 11th day of November, 1921.

JOHN R. GAMMETER.